C. CAMPBELL.
TIRE ARMOR.
APPLICATION FILED SEPT. 3, 1915.

1,213,072.

Patented Jan. 16, 1917.
2 SHEETS—SHEET 1.

Witnesses
A. V. Doyle
James R. Keeble

Inventor
C. Campbell,
By Victor J. Evans
Attorney

C. CAMPBELL.
TIRE ARMOR.
APPLICATION FILED SEPT. 3, 1915.
1,213,072.
Patented Jan. 16, 1917.
2 SHEETS—SHEET 2.
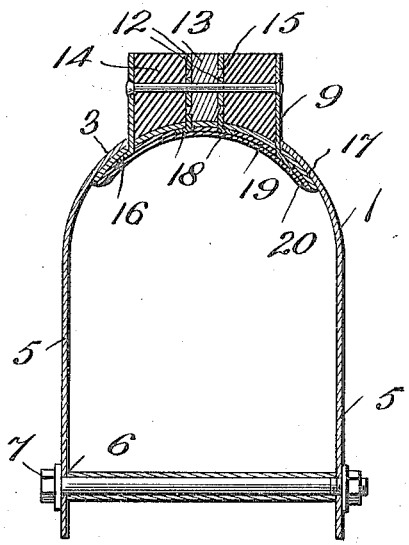
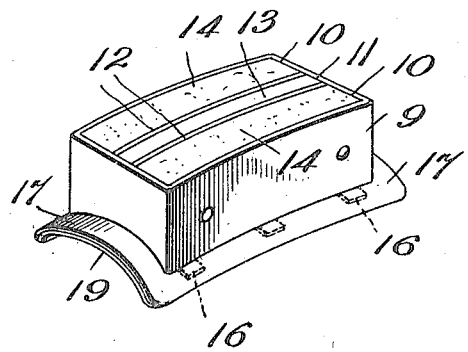
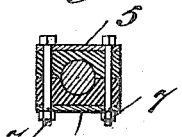
Witnesses
A. V. Doyle
Inventor
C. Campbell,
By Victor J. Evans
Attorney

UNITED STATES PATENT OFFICE.

COLIN CAMPBELL, OF YONKERS, NEW YORK.

TIRE-ARMOR.

1,213,072.　　　　　Specification of Letters Patent.　　Patented Jan. 16, 1917.

Application filed September 3, 1915. Serial No. 48,907.

*To all whom it may concern:*

Be it known that I, COLIN CAMPBELL, a citizen of the United States, residing at Yonkers, in the county of Westchester and State of New York, have invented new and useful Improvements in Tire-Armor, of which the following is a specification.

This invention relates to tire armors and has for its primary object the provision of an armor of this character which may be readily and effectually applied to any standard form of vehicle wheel, particularly automobile wheels, and arranged thereon so as to protect and house the tire, rendering the latter proof against puncture by foreign objects and protecting the same to a very satisfactory degree against undue wear and tear.

Another object of the invention is the provision of a tire armor of this character which will consist principally of companion sections which may be placed around the tire and then connected with the wheel in a manner which will prevent the armor from creeping around the tire, thus preventing friction between the armor and the tire.

A still further object of the invention is the provision of an armor having a radially movable tread surface built up from a plurality of identical elements which are detachably arranged upon the sections of the armor so that any one of the elements may be quickly removed when worn and replaced by a new one, at a minimum cost.

A further object of the invention is the provision of a tire armor having a tread surface made up of a plurality of separable elements each being free from the other and provided with a relatively broad flange against which the inflated tire is adapted to come in immediate purchase and thus cause the several elements to be operatively extended to active points laterally of the wheel where they will come into proper contact with the surface of the roadway.

It is further desired to provide a tire armor in which the traction surface of the wheel may be materially increased without taking away from the tire its desired yieldable qualities, and which, also will be designed so as to minimize skidding of the wheel.

Figure 1:
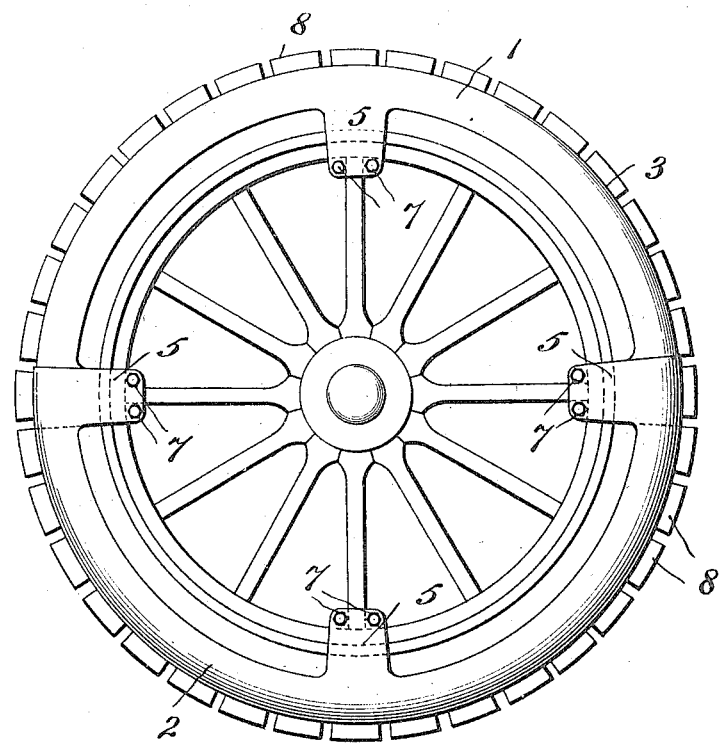
Figure 2:
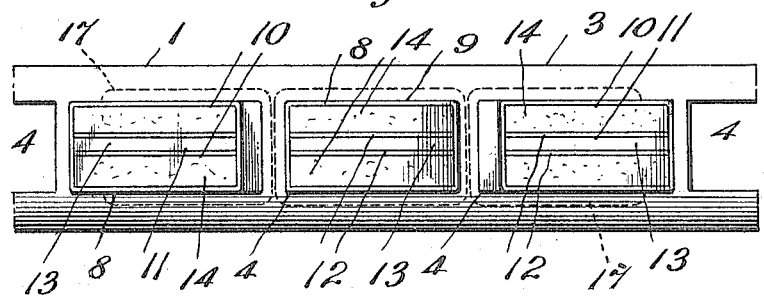

In the drawings forming a part of this specification and in which like numerals represent like parts throughout the several views: Figure 1 is a side view of a vehicle wheel properly equipped with the armor. Fig. 2 is a top plan view of a part of one section of the armor. Fig. 3 is a vertical section therethrough showing the connecting means for properly retaining the armor to the wheel. Fig. 4 is a perspective view of one of the removable tread elements of the armor. Fig. 5 is a section through one of the spokes of the wheel showing the fastening means.

In carrying the invention into practical and commercial effect, it is desired, in order not to interfere with the yielding properties or qualities of the present form of pneumatic tire, to provide an armor having embodied therein a number of tread elements which are separable from one another and capable of moving independently. In order that such elements may be properly arranged around the periphery of the tire, use is made of two metallic casing sections 1 and 2 constructed preferably of spring steel. These sections are substantially identical and each is provided with a semi-circular body 3 having arranged therein at spaced intervals passages 4 which, in the present instance, are of rectangular formation. The casing sections 1 and 2 are arranged to overlap one another at the joints so that the casing will be continuous around the tire, as shown in Fig. 1. In order to hold the casings associated, not only with each other but with the wheel and to guard against creeping of the casing around the tire, each section of the casing is formed along its opposite sides with radial lugs or extensions 5 which extend inwardly to a point where they will be disposed respectively at the opposite sides of certain spokes of the wheel, as also clearly illustrated in Fig. 1. At the points where one section overlaps the other the extensions 5 for one section are arranged to come side by side. The extensions or lugs are apertured at spaced intervals, as at 6, to receive attaching bolts 7. These bolts are extended under the rim of the wheel and against the sides of the spokes and when applied they coöperate with the spokes to hold the casing against the undesirable circumferential creeping around the tire. In this manner the friction between the armor and the tire will be eliminated and as a consequence thereof the tire will be held or guarded against undue wear and tear. This manner of connecting the sections to the wheel is not only practical from experience in that the casing is held against moving around the wheel, but it has the additional advantage of permitting the device to be expeditiously applied and to serve as a means for connecting one section of the casing with the other.

As stated, the sections 1 and 2 are of substantially semi-circular formation in transverse section, as is properly brought out in Figs. 1 and 3. Incident thereto the sides of the tire are protected from foreign objects, such as nails, glass, etc. In order to increase the traction surface of the wheel and to relieve the tire of undue strain and wear and tear, as well as affording a very satisfactory buoyant surface by means of which the wheel may be brought into contact with the surface of the roadway, which will be hereinafter explained, tread elements 8 are employed. These elements are identical in construction and a description of one will, of course, suffice for the other. Specifically speaking, each element is formed from a rectangular metallic shell 9 having subdivisions or compartments 10—10 and 11 defined by the walls of the shell and longitudinal walls 12. In the central compartment or division 11 is arranged a body of lead or like flat metallic material 13, while in the divisions 10 it is desired to arrange yieldable bodies 14 of rubber. The walls 12 are provided with small perforations 15, and in the manufacture of the elements 8 it is proposed that the bodies 13 thereof may be formed by simply pouring hot lead into each of the divisions 11. In the progress of so doing the lead will circulate in part in the perforations 15 and securing projections will be immediately formed, so as to cause these metallic bodies 13 in their finished state, to be held against casual separation from the device. The shells 9 are of a design corresponding with the passages 4. They are adapted to move therethrough and radially of the axis of the vehicle wheel.

In order that the elements 8 may be held normally projected to active positions beyond the tire the shell of each element has its walls up-struck at 16 against a concavo-convex base flange 17. The walls 12 are correspondingly upset at 18 against the said base flange, and by means thereof the shell and base flange are properly secured with each other. The base flange conforms in transverse configuration to that of the tread sections 1 and 2. Each base flange is provided with a rubber or other suitable yieldable lining 9 against which the tread surface of the tire of the wheel is adapted to come into direct purchase when the tire is inflated. The just described manner of yieldingly backing up these several tread elements 8 is essential to the active presentation of these elements beyond the tread of the wheel and the arrangement accomplishes also the purpose of preventing the wheel from skidding to any material degree as the independent movement of the several elements 8 will cause such irregularities in the periphery of the wheel as will invite the elements to take a very substantial purchase against the roadway, as will be understood.

It is desirable to provide a lining 20 interposed between the shoe of the tire and the base flanges 17 so as to prevent the heating of the tire under any possible heated conditions of the flanges 17 and the shells carried thereby.

It is desired to state that rubber sectional sleeves are interposed between the lugs 5 and are adapted to be brought into contact with the spokes so as to prevent undue wear and strain upon the same. By providing yieldable sleeves of the nature set forth they will properly accommodate themselves to various adjustments of the attaching bolts 7.

What is claimed as new is:

A protector for tires comprising a casing extending around the tire and detachable therefrom, said casing having passages therein, and tread elements freely removable in said passages and projecting beyond said casing, each of said elements comprising a shell, a concavo-convexed base flange bearing against the under side of said casing, the walls of the shell having portions passing through the flange and upset against the under side thereof, the said flange closing against the bottom of the shell, and a facing of pliable material extending entirely over one side of the flange and over said upset portions of the shell.

In testimony whereof affix my signature in presence of two witnesses.

COLIN CAMPBELL.

Witnesses:
A. V. DOYLE,
GEO. A. BYRNE.

Copies of this patent may be obtained for five cents each, by addressing the "Commissioner of Patents, Washington, D. C."